(12) United States Patent
Lin et al.

(10) Patent No.: US 10,461,914 B2
(45) Date of Patent: Oct. 29, 2019

(54) TRIPLEXER WITH TRANSMIT/RECEIVE SWITCH

(71) Applicant: Apple Inc., Cupertino, CA (US)

(72) Inventors: Saihua Lin, Cupertino, CA (US);
Sohrab Emami-Neyestanak, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 15/937,467

(22) Filed: Mar. 27, 2018

(65) Prior Publication Data
US 2019/0305919 A1    Oct. 3, 2019

(51) Int. Cl.
*H04L 5/14*    (2006.01)

(52) U.S. Cl.
CPC .................................. *H04L 5/14* (2013.01)

(58) Field of Classification Search
CPC ....... H04B 1/0057; H04B 1/406; H04B 1/525
See application file for complete search history.

(56) References Cited

U.S. PATENT DOCUMENTS

| | | | |
|---|---|---|---|
| 8,462,753 B2 * | 6/2013 | Eom | H01Q 1/3275 370/339 |
| 9,692,458 B2 | 6/2017 | Talty et al. | |
| 9,722,639 B2 | 8/2017 | Khlat et al. | |
| 9,813,089 B2 | 11/2017 | Talty et al. | |
| 2015/0244548 A1 | 8/2015 | Weissman et al. | |

FOREIGN PATENT DOCUMENTS

CN    202455351 U    9/2012

* cited by examiner

*Primary Examiner* — Chandrahas B Patel
(74) *Attorney, Agent, or Firm* — Meyertons, Hood, Kivlin, Kowert & Goetzel, P.C.; Eric A. Heter

(57) ABSTRACT

A triplexer having integrated switching circuitry is disclosed. In one embodiment, a triplexer is used, in a transmit mode, to combine a clock signal, a control signal, and a modulated (e.g., a radio frequency, or RF) signal into a composite signal for transmission over a transmission line. In a receive mode, the triplexer receives and separates the composite signal into the clock signal, the control signal, and the modulated signal. The triplexer further includes switching circuitry integrated therein. The switching circuitry is operable to switch the triplexer between the transmit and receive modes.

20 Claims, 5 Drawing Sheets

TRIPLEXER WITH TRANSMIT/RECEIVE SWITCH

BACKGROUND

Technical Field

This disclosure is directed to radio frequency (RF) circuits, and more particularly, triplexers used in systems in which signals are conveyed between an RF front end circuit and a baseband circuit.

Description of the Related Art

In many radio systems, it is often necessary to transmit multiple signals between different chips or different circuits. When the multiple signals have different frequencies, these signals can often times be combined into a composite signal for transmission, and separated into separate signals upon reception.

One such circuit for performing combining and separation of composite signals is known as a triplexer. Some triplexer circuits may be bidirectional. A bidirectional triplexer circuit can receive three different signals having three different frequencies and combine them into a single composite signal. A bidirectional triplexer circuit can also receive a composite signal and separate the composite signal into three separate signals each having different frequencies. A separate switch may be coupled in series with a triplexer circuit, thereby allowing it to be operated in a signal combining mode (to produce and output a composite signal) or a signal extraction mode (to extract separate signals from a received composite signal).

SUMMARY

A triplexer having integrated switching circuitry is disclosed. In one embodiment, a triplexer is used, in a transmit mode, to combine a clock signal, a control signal, and a modulated (e.g., a radio frequency, or RF) signal into a composite signal for transmission over a transmission line. In a receive mode, the triplexer receives and separates the composite signal into the clock signal, the control signal, and the modulated signal. The triplexer further includes switching circuitry integrated therein. The switching circuitry is operable to switch the triplexer between the transmit and receive modes.

In one embodiment, a system includes a baseband circuit coupled to an RF circuit by a transmission line such as a coaxial conductor. Each of the baseband and RF circuits include a triplexer coupled to the coaxial conductor. When the system is transmitting signals from the RF circuit, the triplexer of the baseband circuit operates in the first mode, while the triplexer of the RF circuit operates in the second mode. For receiving signals, the integrated switch in each of the triplexers can switch their respective modes, e.g., the triplexer of the baseband circuit is switched to the second mode, while the triplexer of the RF circuit is switched to the first mode.

BRIEF DESCRIPTION OF THE DRAWINGS

The following detailed description makes reference to the accompanying drawings, which are now briefly described.

Figure 1:
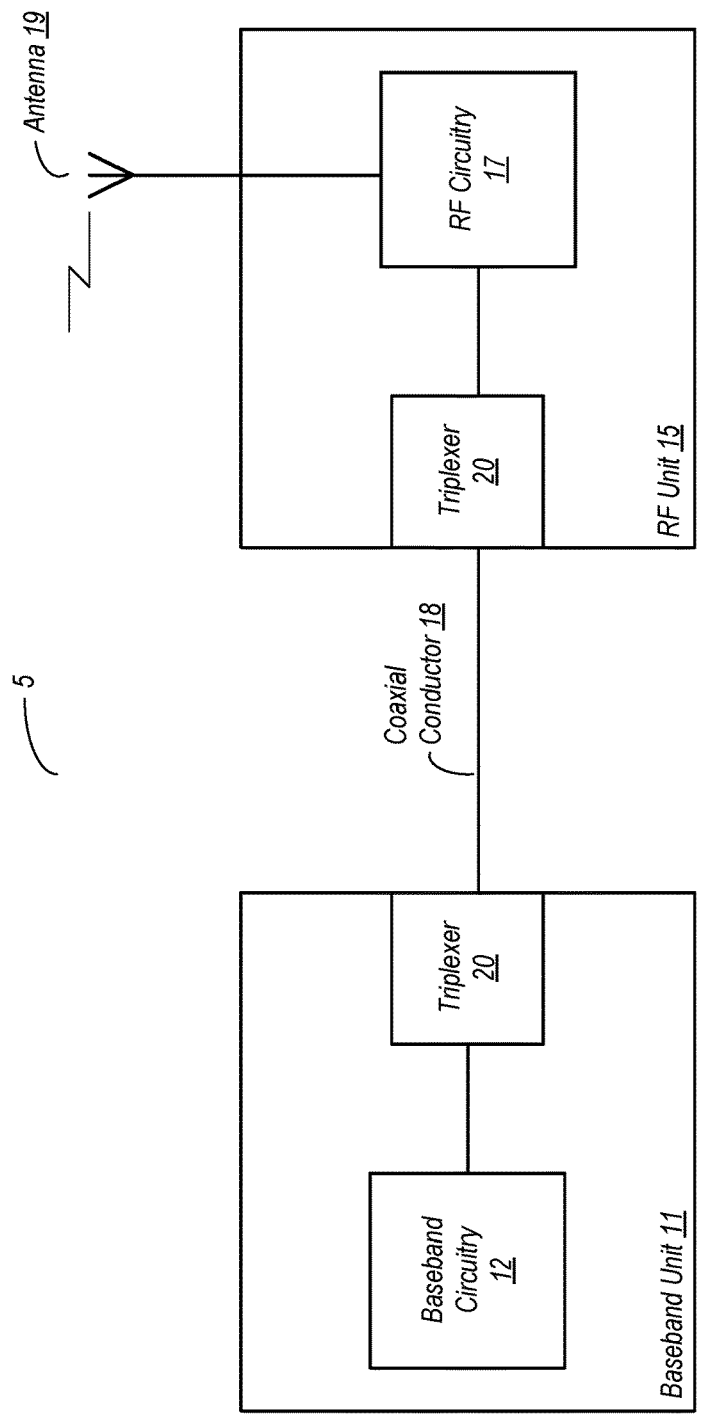
FIG. 1 is a block diagram of one embodiment of a system including a baseband chip and an RF chip.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

FIG. 1 is a block diagram of one embodiment of a system including a baseband chip and a radio frequency (RF) chip. System 5 as shown here is a simplified example provided to illustrate certain aspects of the disclosure, but is not intended to be limiting.

System 5 in the embodiment shown includes a baseband unit 11, implemented on a first integrated circuit (IC) and an RF unit 15, implemented on a second IC. In some embodiments, both baseband unit 11 and RF unit 15 are implemented on a single IC. Baseband unit 11 and RF unit 15 are coupled to one another by a transmission line, which is coaxial conductor 18 in this particular embodiment. However, the disclosure is not limited to implementations in which the transmission line is a coaxial conductor, as other transmission line implementations (e.g., stripline, waveguide, etc.) are possible and contemplated.

Baseband circuitry 12 (in baseband unit 11) is configured to perform various processing functions. These functions may include (but are not limited to) modulating outgoing transmissions, demodulating incoming transmissions, conversion between analog and digital, information formatting, and so on. RF circuitry 17 (in RF unit 15) may perform various functions related to the transmission and reception of modulated signals. These functions may include (but are not limited to) frequency up-conversion for outgoing transmissions, frequency down-conversions for incoming transmissions, Both baseband unit 11 and RF unit 15 include a triplexer circuit 20. Each triplexer circuit 20 is a bidirectional circuit, meaning that each of them can either convey signals onto coaxial conductor 18 or receive signals therefrom.

In a first mode, a composite signal is conveyed from a triplexer 20 onto coaxial conductor 18. Each triplexer 20 may combine three different signals to form the composite signal. The composite signal in this embodiment is made up of a control signal, a clock signal, and a modulated signal. Each of these signals have different frequencies. The frequency separation between these signals may be significant enough that they signals can easily be separated by filtering. The modulated signal may, in one embodiment, be an RF signal (e.g., if system 5 conforms to a direct conversion architecture). In another embodiment (e.g., a heterodyne architecture), the modulated signal may be an intermediate frequency (IF) signal.

In the second mode, a triplexer 20 may receive the composite signal and separate it into its constituent parts. As explained below, various filters are used to separate the individual signals from the composite signal. After separation, the individual signals are conveyed to their respective destinations.

Each triplexer 20 as shown here includes integrated switching circuitry. The switching circuitry may be used to switch its corresponding triplexer into the first mode or the second mode. In some embodiment, the triplexer may be switched to a mode in which it is in neither the first or second modes. Integrating the switching circuitry may obviate the need to place a switch in series with a triplexer circuit. In conventional embodiments, where a switch is in series with a triplexer, cascaded signal losses from such a configuration can degrade transmission efficiency and reduce receiver sensitivity. Thus, in order to compensate for these losses, more power may be applied, which can be wasteful. This problem may be exacerbated in battery-powered environment, reducing battery life. However, the integrated switching circuitry of the triplexer disclosed herein does not add any significant signal loss, and thus may avoid the problems of the conventional arrangement.

Figure 2:
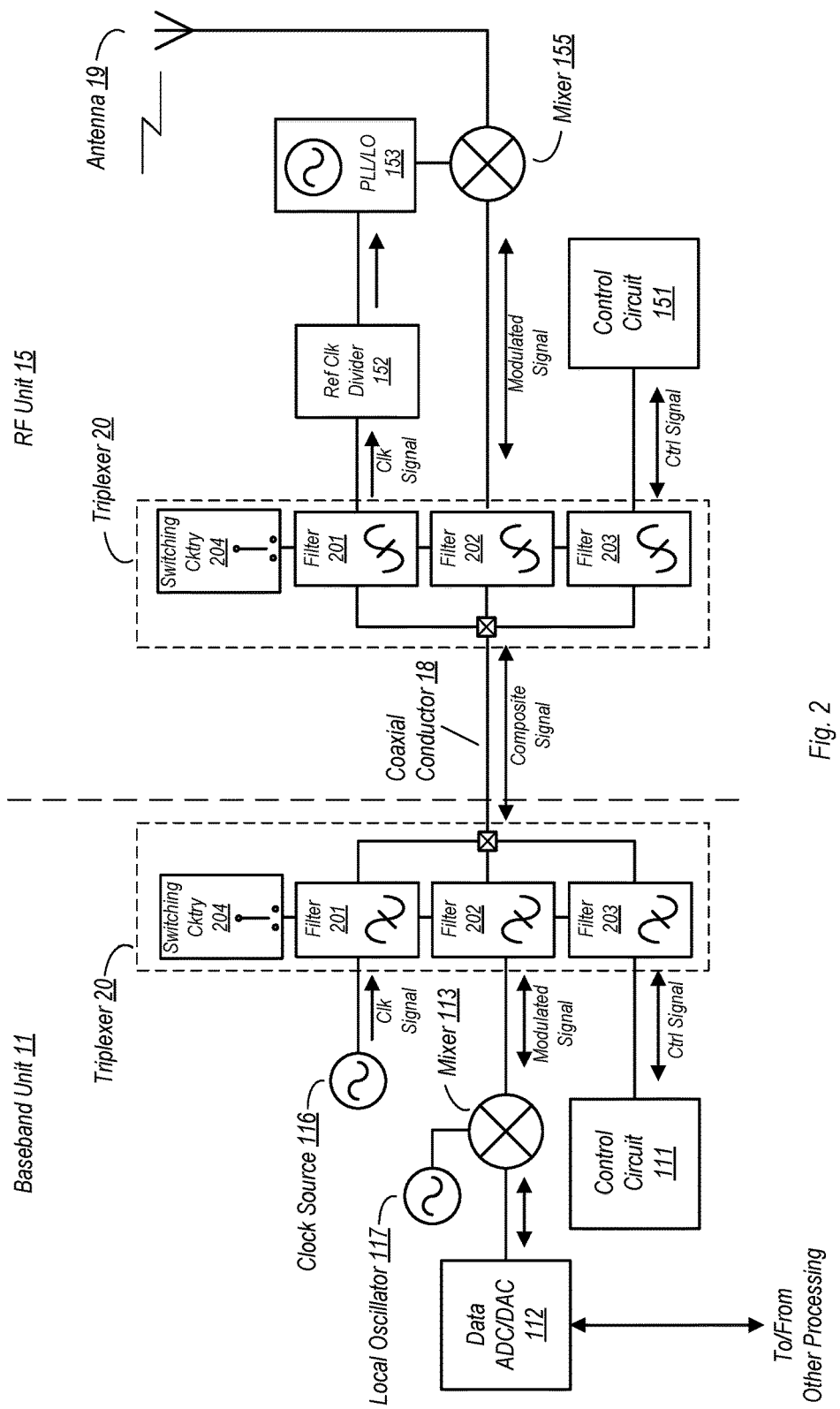
FIG. 2 is a diagram further illustrating an embodiment of the system of FIG. 1.

FIG. 2 is a diagram further illustrating details of system 5 shown in FIG. 1. As with the embodiment of system 5 discussed above, the system shown in FIG. 2 is divided into a baseband unit 11 and an RF unit 15. It is noted that this particular embodiment conforms to a heterodyne architecture, although the disclosure is not limited in this manner.

The baseband circuitry in baseband unit 11 includes a data ADC/DAC (analog-to-digital converter/digital-to-analog converter) block 112 used to convert digital data into analog data and vice versa. Although not explicitly shown, data ADC/DAC may be coupled to additional processing circuitry that may perform various functions (e.g., packetizing data, etc.). Data ADC/DAC 112 in the embodiment shown in coupled to mixer 113, which in turn is also coupled to receive a periodic signal from local oscillator 117. For outgoing transmissions, data ADC/DAC 112 may convey signals to mixer 113, where they are modulated based on the periodic signal received from local oscillator 117. As this particular embodiment conforms to a heterodyne architecture, the modulated signal output from mixer 113 is an intermediate frequency (IF) signal.

For incoming transmissions, the modulated IF signal is received by mixer 113 and demodulated, with the resulting data signals being conveyed to data ADC/DAC 112.

The baseband circuitry in baseband unit 11 also includes a control circuit 111, and a clock source 116. The control circuit 111 may perform various control functions within baseband unit 11. The control circuit may also transmit a control signal along with outgoing transmissions, and receive a control signals along with incoming transmissions. The clock source 116 in the embodiment shown generates a clock signal that is conveyed with outgoing transmissions.

Within RF unit 15, the modulated signal is received by mixer 155 during outgoing transmissions. The clock signal is provided to reference clock divider 152, which in turn conveys a reference clock signal to phase-locked loop/local oscillator (PLL/LO) 153. The periodic output signal provided by PLL/LO 153 is in turn provided to mixer 155. It is noted that embodiments are possible and contemplated in which RF unit 15 includes other clock consumers in addition to reference clock divider, and thus the clock circuitry may be conveyed to these circuits as well.

During outgoing transmissions, the received modulated signals is upconverted to a radio frequency (RF) signal and conveyed to antenna 19 for wireless transmission. It is noted that, in some embodiments, additional transmission circuitry may be included to ensure that the outgoing RF signal has sufficient transmit power. For incoming transmissions, mixer 155 receives the RF signal from antenna 19 and downconverts the signal to produce the modulated signal as an IF signal.

RF unit 15 also includes a control circuit 151. During transmissions that are outgoing from the illustrated system, control circuit 151 receives a control signal conveyed from baseband unit 11. During transmissions that are received by the illustrated system, control circuit 151 transmits a control signal that is eventually received by control circuit 111 of baseband unit 11.

Both baseband unit 11 and RF unit 15 include respective instances of triplexer 20. Each triplexer 20 as shown here includes filters 201, 202, and 203, along with integrated switching circuitry 204. When the illustrated systems is to transmit RF signals, triplexer 20 of baseband unit 11 receives the clock signal, the modulated signal, and the control signals. These signals are then combined by the triplexer 20 of baseband unit 11 to produce the composite signal, which is conveyed onto coaxial conductor 18. Upon receiving the composite signal, triplexer 20 of RF unit 15 separates the components of the composite signal using filters 201, 202, and 203, to recover the individual signals. Filter 201 separates the clock signal from the composite signal, filter 202 separates the modulated signal from the composite signal, and filter 203 separates the control signal from the composite signal.

For transmissions from RF unit 15 to baseband unit 11, no clock signal is included in this particular embodiment. However, triplexer 20 of baseband unit 11 nevertheless includes the same capabilities as that of RF unit 15. Additionally, embodiments are possible and contemplated in which a clock signal is transmitted from RF unit 15 to baseband unit 11. In this particular embodiment, the modulated signal and the control signal are combined into a composite signal by triplexer 20 of RF unit 15, with the composite signal being conveyed back to baseband unit 11. There, the triplexer 20 applies the filters to the composite signal to separate the modulated signal and the control signal from one another and convey them to their respective destinations within baseband unit 11.

Figure 3:
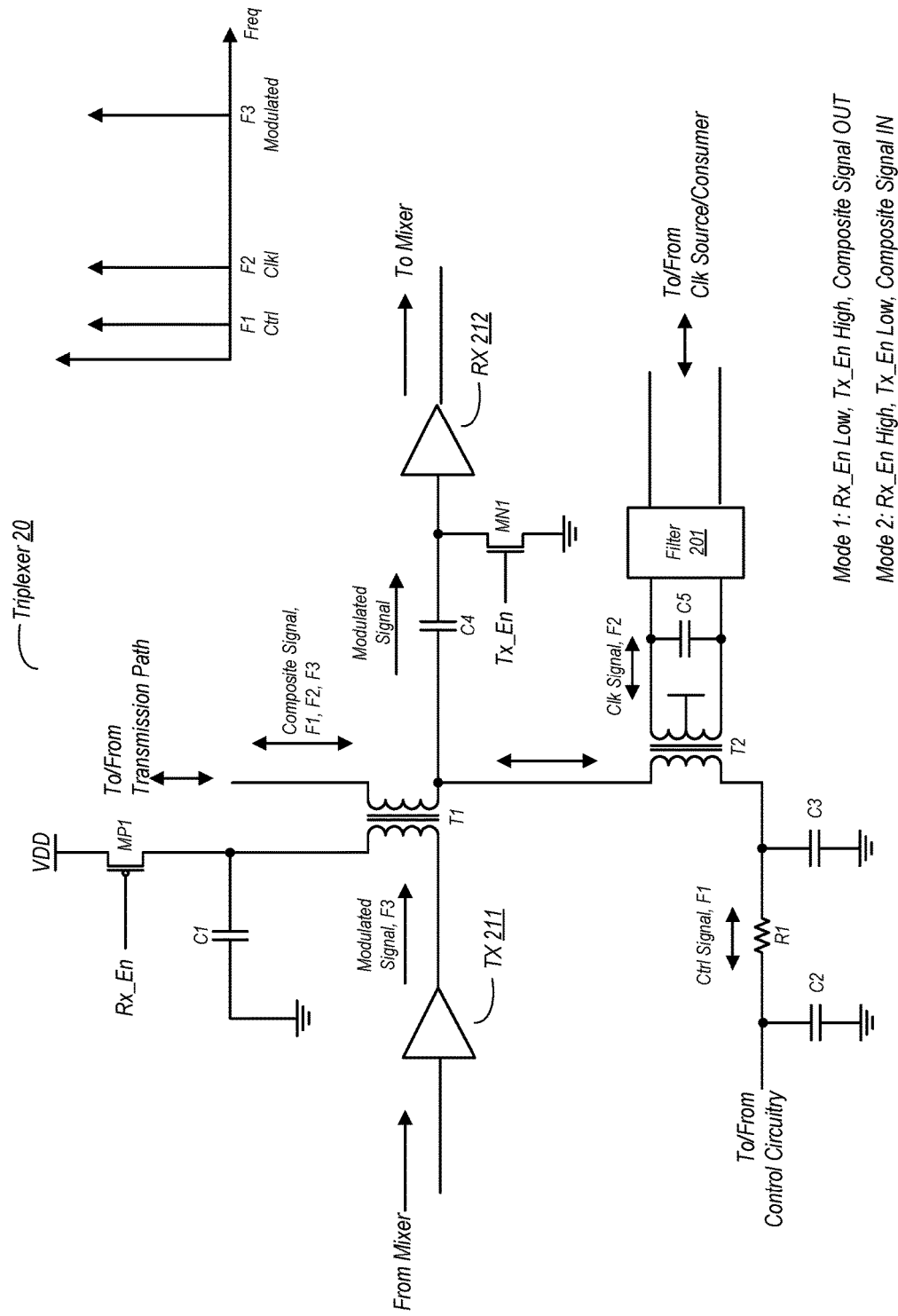
FIG. 3 is a schematic diagram of one embodiment of a triplexer circuit with integrated switching circuitry.

FIG. 3 is a schematic diagram of one embodiment of a triplexer having integrated switching circuitry. In the embodiment shown, triplexer 20, in accordance with the embodiments discussed above, is a bi-directional circuit that can combine separate signals into a composite signal to be conveyed onto a transmission path and that can also receive a composite signal and separate it into the individual signals contained therein.

A first mode of operation of triplexer 20 may be referred to as a transmit mode, while a second mode may be referred to as a receive mode. It should be noted that the modes of the triplexer are not to be confused with the mode of operation of the system in which it is implemented with regard to transmitting or receiving wireless signals. The transmit mode of triplexer 20 refers to a mode in which individual signals are received and combined into a composite signal conveyed onto a transmission path. The receive mode of triplexer 20 refers to a mode in which a composite signal is received from a transmission path and separated into its individual signals which are then conveyed to their respective destinations.

The switching circuitry of this embodiment of triplexer 20 includes two transistors, MP1 and MN1. Transistor MP1 is a PMOS transistor coupled between a voltage source (VDD in this embodiment) and transformer T1. During operation in the first (transmit) mode, the active high signal Rx_En is low, and thus MP1 is activated. As a result, current is provided to transistor T1. Capacitor C1, coupled at the junction of MP1 and T1, may provide a short circuit to ground for power supply noise in order to prevent such noise from affecting the signals combined on T1.

Transistor MN1, coupled between an input to a receiver 212, and ground, is activated responsive to receiving the active high signal Tx_En. When Tx_En is asserted, any modulated signal received on the drain terminal of MN1 is effectively shunted to ground. This prevents any non-negligible level of the modulated signal from being input into receiver 212.

When triplexer 20 is to be operated in the second (receive) mode, Rx_En is provided as a logic high, while Tx_En is provided as a logic low. As a result, both MP1 and MN1 are inactive in the second mode. When MP1 is inactive, no current is provided through this device to transistor T1. With MN1 inactive, a modulated signal can be received by receiver 212 since the shunt path to ground is cut off.

In some systems, triplexer 20 may be operated in a third mode in which signals are neither transmitted nor received. In this third mode, MP1 may be inactive while MN1 is active. This results in transformer T1 being cut off from current provided via MP1, while the active MN1 shorts any modulated signal to ground.

When operating in the first mode, triplexer 20 receives a control signals at a first frequency, F1, a clock signal at a second frequency, F2, and a modulated signal at a third frequency, F3. An example graph that generally illustrates the frequency relationships of these signals is shown in the upper right hand corner of the drawing, although it is to be noted that this graph is not to any scale, and is provided as an example primarily for illustrated purposes. It is further noted that triplexer 20 can be designed to handle a multitude of different signal types with different frequency relationships to one another.

The control signal, received from control circuitry (not shown in FIG. 3) when operating in the first mode, is conveyed through resistor R1 to transformer T2. Resistor R1 and capacitor C3 form a low pass filter for the outgoing control signal. The clock signal is received from a clock source and conveyed through filter 201, which is a bandpass filter in this embodiment. The clock signal and the control signal are effectively combined into a signal having two major frequency components, F1 and F2, by transformer T2. In the illustrated example, transformer T2 also includes an optional tap, which, when present, may be connected to a voltage source.

The modulated signal is received by transmitter 211 when operating in the first mode. Transmitter 211 may be a buffer, amplifier, or any other suitable circuitry for outputting the modulated signal at sufficient signal strength. The modulated signal is conveyed from an output of transmitter 211 to transformer T1. Transformer T1 is also coupled to transformer T2, and is thus responsive to the combined signal including the control signal and the clock signal. Accordingly, in the first mode, transformer T1 combines the modulated signal with the combined control and clock signals to produce the composite signal. As noted above, the composite signal includes three main frequency components, F1, F2, and F3, of the control signal, the clock signal and the modulated signal, respectively. The composite signal is conveyed from T1 onto the transmission path.

In the second mode, the composite signal is received from the transmission path via transformer T1. Capacitor C4, coupled between T1 and the input to receiver 212, acts as a filter that is effectively a short circuit at frequency F3 and effectively an open circuit at F1 and F2. Accordingly, the modulated signal is passed from T1 to the input of receiver 212, while C4 blocks the control and clock signals. The modulated signal is then transmitted from receiver 212 to a mixer or other destination. Receiver 212 in the embodiment shown may be a buffer, amplifier, or other type of circuitry suitable for receiving the modulated signal and outputting the same at a desired signal strength.

The composite signal is also received by transformer T2 when operating in the second mode. Resistor R1 and capacitor C2 form a low-pass filter for the incoming control signal. The low pass filter rejects signals at F2 and F3, thereby allowing the controls signal, at F1, to pass. The control signal is conveyed from the output of this low-pass filter to control circuitry. Meanwhile, the clock signal, when part of the composite signal, is received by filter 201, which is a bandpass filter that is effectively transparent at F2, but rejects signals at frequencies F1 and F3. Accordingly, filter 201 allows the clock signal to pass, where it is subsequently conveyed to a clock consumer. Capacitor C5, in combination with transformer T2, provides further filtering.

Figure 4:
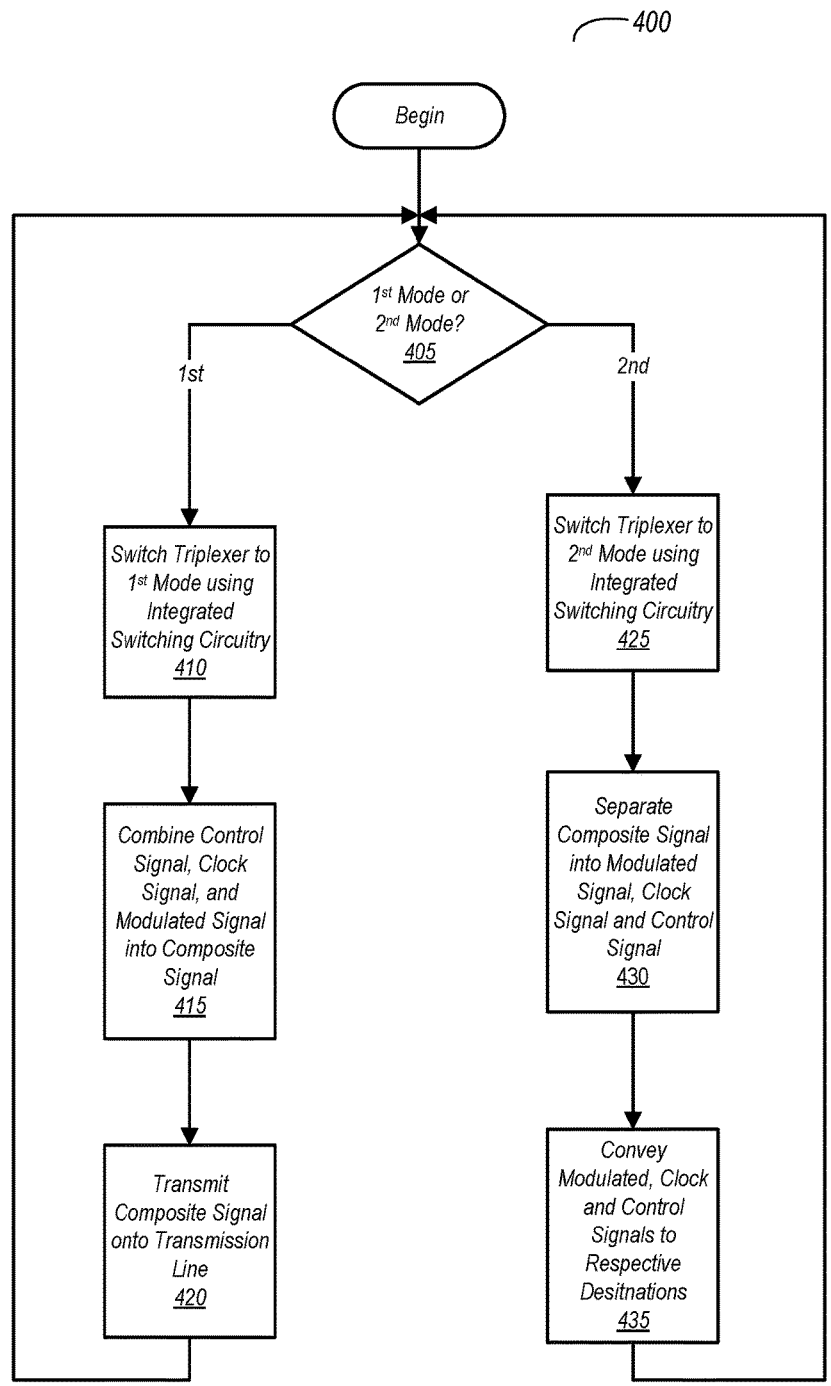
FIG. 4 is a flow diagram illustrating the operation of one embodiment of a triplexer having integrated switching circuitry.

FIG. 4 is a flow diagram illustrating one embodiment of a method for operating a triplexer circuit. Method 400 may be performed by the triplexers discussed above, and variations thereof that are not explicitly mentioned herein. The triplexers discussed in method 400 assume the presence of integrated switching circuitry. Furthermore, it is noted that while method 400 assumes operation in one of the first and second modes, embodiments are possible in which operation in a third mode (neither transmitting nor receiving) are possible and contemplated.

If the triplexer is to be operated in the first mode (block 405, $1^{st}$), switching circuitry integrated into the triplexer is switched for first mode operation (block 410). During operation in the first mode, the triplexer receives and combines a control signal, a clock signal, and a modulated signal into a composite signal (block 415). Generally speaking, the signals combined can be any type of signals, each of which has a different frequency with respect to one another. The composite signal is then transmitted onto a transmission line (420), such as a coaxial cable.

If the triplexer is to be operated in the second mode (block 405, $2^{nd}$), the integrated switching circuitry is set to switch the triplexer for second mode operation (block 425). An incoming composite signal is then separated into its different components, which may include a modulated signal, a clock signal, and a control signal (block 430). After separation, the control, clock, and modulated signals are conveyed to their respective destinations (block 435).

Figure 5:
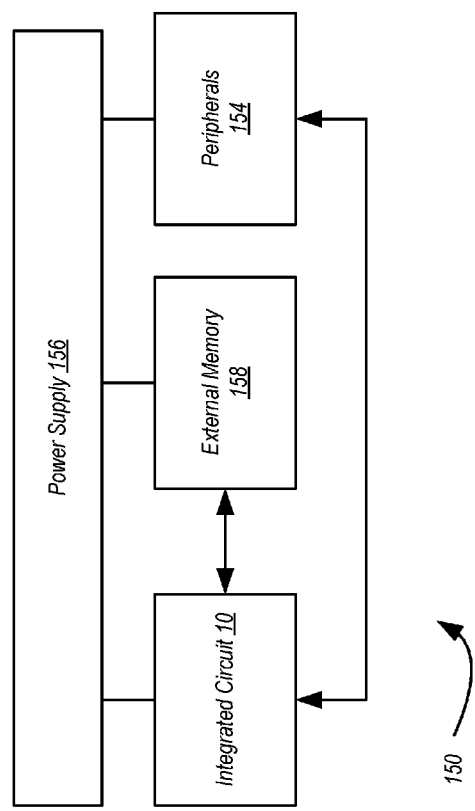
FIG. 5 is a block diagram of an example system.

Turning next to FIG. 5, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A circuit comprising:
   a transmission line; and
   a triplexer circuit coupled to the transmission line, wherein the triplexer circuit is configured to:
   in a first mode, combine and transmit, onto the transmission line, a control signal having a first frequency, a clock signal having a second frequency that is greater than the first frequency, and a modulated signal having a third frequency that is greater than the second frequency; and
   in a second mode, receive from the transmission line a composite signal including the control signal, the clock signal, and the modulated signal, and further configured to separate the control signal, the clock signal, and the modulated into separate signals;
   wherein the triplexer circuit includes integrated switching configured to cause the triplexer circuit to operate in the first mode or the second mode.

2. The circuit as recited in claim 1, further comprising:
a first transformer coupled to the transmission line;
a second transformer coupled to the first transformer;
a transmitter having an output coupled to the first transformer; and
a receiver coupled receive the composite signal from the first transformer.

3. The circuit as recited in claim 2, wherein the transmitter is configured to, when operating in the first mode, cause the first transformer to convey the modulated signal onto the transmission line.

4. The circuit as recited in claim 2, wherein, during operation in the second mode, the receiver is configured to receive the modulated signal from the first transformer and to convey the modulated signal to a destination external to the triplexer.

5. The circuit as recited in claim 2, further comprising a resistive-capacitive (RC) filter coupled to the second transformer and further coupled to a control signal terminal, wherein the RC filter is configured to pass signals having the first frequency and to attenuate signals having the second and third frequencies.

6. The circuit as recited in claim 2, further comprising a bandpass filter coupled to the second transformer, wherein the bandpass filter is configured to pass signals having the second frequency and to attenuate signals having the first and third frequencies.

7. The circuit as recited in claim 2, further comprising a capacitor filter coupled between the first transformer and an input of the receiver, wherein the capacitor filter is configured to pass signals having the third frequency and to attenuate signals having the first and second frequencies.

8. The circuit as recited in claim 2, wherein the integrated switching circuitry comprises a first transistor coupled between a voltage source and the first transformer, and a second transistor coupled between an input of the receiver and a ground node.

9. The circuit as recited in claim 8, wherein, during operation in the first mode each of the first and second transistors are active, and wherein, during operation in the second mode, each of the first and second transistors are inactive.

10. A method comprising:
operating a first triplexer circuit in a first mode, wherein operating in the first mode includes the triplexer combining, into a composite signal, a control signal having a first frequency, a clock signal having a second frequency that is greater than the first frequency, and a modulated signal having a third frequency that is greater than the second frequency, wherein operating in the first mode further comprises conveying the composite signal onto a transmission line; and
operating a second triplexer circuit in a second mode, the second triplexer circuit having a same circuit topology as the first triplexer, and wherein operating in the second mode comprises receiving the composite signal from the transmission line and separating the composite signal into the control signal, the clock signal, and the modulated signal;
wherein the first and second triplexers include first and second integrated switches, respectively, and wherein the method further includes switching the first triplexer to the second mode using the first integrated switch and switching the second triplexer to the first mode using the second integrated switch.

11. The method as recited in claim 10, further comprising:
in the first mode, a transmitter of the first triplexer transmitting the modulated signal to a first transformer of the first triplexer;
a second transformer of the first triplexer combining the clock signal and the control signal into a combined signal;
the first transformer combining the modulated signal and the combined signal to produce the composite signal;
the first transformer conveying the composite signal onto the transmission line;
a third transformer receiving the composite signal, the third transformer being part of the second triplexer; and
a receiver of the second triplexer receiving the modulated signal from the third transformer via a capacitor filter.

12. The method as recited in claim 11, further comprising
a fourth transformer receiving the composite signal from the third transformer, wherein the fourth transformer is a component of the second triplexer;
a resistive-capacitive (RC) filter of the second triplexer filtering the composite signal to attenuate the modulated signal and the bandpass signal and pass the control signal to a control terminal;
a bandpass filter filtering the composite signal to attenuate the modulated signal and the control signal and passing the clock signal to a clock consumer.

13. The method as recited in claim 10, wherein conveying the composite signal onto the transmission line comprises conveying the composite signal onto a coaxial conductor.

14. A system comprising:
an antenna;
a radio frequency (RF) circuit coupled to the antenna and configured to transmit signals to the antenna and receive signals from the antenna;
a baseband circuit configured to modulate a data signal to produce a modulated output signal and de-modulate a modulated input signal to produce a data signal; and
a coaxial transmission path coupled between the RF circuit and the baseband circuit, wherein the baseband circuit and the RF circuit are each coupled to convey a composite signal to one another via the coaxial transmission path;
wherein each of the RF and baseband circuits includes a corresponding triplexer circuit, wherein each corresponding triplexer circuit includes switching circuitry integrated therein configured to cause the triplexer circuit to operate in a first mode or a second mode, wherein:
in the first mode, a given triplexer circuit is configured to produce the composite signal by combining a control signal, a clock signal, and the modulated signal; and
in the second mode, the given triplexer is configured to separate the composite signal to extract and separate from one another the control signal, the clock signal, and the modulated signal.

15. The system as recited in claim 14, wherein each triplexer circuit includes:
a first transformer coupled to the coaxial transmission path;
a second transformer coupled to the first transformer;
a transmitter having an output coupled to the first transformer; and
a receiver having an input coupled receive the composite signal from the first transformer.

16. The system as recited in claim 15, wherein the transmitter configured to convey the modulated signal to the first transformer.

17. The system as recited in claim 15, wherein each triplexer circuit further includes a capacitive filter coupled between the first transformer and an input of the receiver, wherein the capacitive filter is configured to pass the modulated signal to the input of the receiver and further configured to attenuate the clock signal and the control signal.

18. The system as recited in claim 15, wherein each triplexer further includes:
- a resistive-capacitive (RC) filter coupled between a control node and the second transformer, wherein the RC filter is configured to pass the control signal and to attenuate the clock signal and the modulated signal; and
- a bandpass filter coupled between the second transformer and a clock node, wherein the bandpass filter is configured to pass the clock signal and to attenuate the control signal and the modulated signal.

19. The system as recited in claim 15, wherein, during operation in the first mode of each triplexer circuit, the second transformer is configured to receive and combine the clock signal and the control signal to produce a combined signal, and wherein the first transformer is configured to receive and combine the modulated signal and the combined signal to produce the composite signal.

20. The system as recited in claim 15, wherein the switching circuitry comprises a first transistor coupled between a voltage supply node and the first transformer, and a second transistor coupled between an input of the receiver and a ground node.

\* \* \* \* \*